United States Patent [19]
Engelsmann et al.

[11] 3,825,939
[45] July 23, 1974

[54] FILM TRANSPORTING MECHANISM FOR PHOTOGRAPHIC CAMERAS

[75] Inventors: Dieter Engelsmann, Unterhaching; Dieter Maas, Munich; Rolf Schröder, Baldham, all of Germany

[73] Assignee: AGFA-Gevaert Aktiengesellschaft, Leverkusen, Germany

[22] Filed: Nov. 28, 1973

[21] Appl. No.: 419,728

[30] Foreign Application Priority Data
Nov. 30, 1972 Germany.......................... 2258639

[52] U.S. Cl................................. 354/213, 354/204
[51] Int. Cl....... G03b 1/10, G03b 1/16, G03b 17/42
[58] Field of Search ......... 95/31 FM, 31 AC, 31 FL

[56] References Cited
UNITED STATES PATENTS

| | | | |
|---|---|---|---|
| 2,307,748 | 1/1943 | Philips | 95/31 R |
| 3,580,152 | 5/1971 | Engelsman et al. | 95/31 FM |
| 3,595,149 | 7/1971 | Fujimoto | 95/31 AC |
| 3,621,770 | 11/1971 | Tsuruoka | 95/31 FL |
| 3,641,897 | 2/1972 | Fujimoto | 95/31 AC |
| 3,682,066 | 8/1972 | Simon | 95/31 FM |
| 3,735,681 | 5/1973 | Galbraith | 95/31 FM |

Primary Examiner—Robert P. Greiner
Attorney, Agent, or Firm—Michael S. Striker

[57] ABSTRACT

A still camera wherein a reciprocable actuating member turns the planet carrier of a planetary transmission whereby the ring gear of the transmission rotates the takeup reel in order to effect the transport of roll film by the length of a frame. When the transport of film by the length of a frame is completed, a control lever is automatically disengaged from a second gear which is rotatable by the sun gear of the transmission so that the second gear can rotate in response to further rotation of the planet carrier from a starting position. The camera release can be depressed only when the control lever is disengaged from the second gear and the planet carrier returns to its starting position.

10 Claims, 3 Drawing Figures

FILM TRANSPORTING MECHANISM FOR PHOTOGRAPHIC CAMERAS

CROSS-REFERENCE TO RELATED APPLICATIONS

The photographic apparatus of the present invention constitutes an improvement over and a further development of photographic apparatus which are disclosed in the commonly owned copending application Ser. No. 314,277 filed by Guenter FAUTH on Dec. 11, 1972 and Ser. No. 396,455 filed by Alfred WINKLER et al. on Sept. 12, 1973.

BACKGROUND OF THE INVENTION

The present invention relates to improvements in photographic apparatus in general, and more particularly to improvements in mechanisms for transporting in a photographic camera roll film of the type having a row of perforations, one for each film frame. Still more particularly, the invention relates to improvements in film transporting mechanisms of the type wherein the input means of a transmission is reciprocable or otherwise movable between a starting position and a second position, a first output member of the transmission can rotate the takeup reel for exposed photographic roll film, and a second output member of the transmission is free to move in automatic response to completion of film transport by the length of a frame.

The copending application Ser. No. 396,455 of Winkler et al. discloses a photographic apparatus wherein the second output member of a planetary transmission is normally engaged by a control member (e.g., a lever) which is disengaged from the second output member when the scanning portion of a feeler penetrates into an oncoming perforation of the film. The second output member then offers less resistance to movement than the first output member whereby the transport of film is completed and the second output member can move in order to perform one or more special functions, such as cocking of the shutter.

SUMMARY OF THE INVENTION

An object of the invention is to provide a photographic apparatus of the just outlined character with novel and improved means for preventing repeated exposure of film frames.

Another object of the invention is to provide a photographic apparatus wherein the means for preventing repeated exposure of film frames need not include any parts which perform the sole function of preventing double exposure so that the provision of such means does not contribute to the bulk, complexity and/or cost of the photographic apparatus.

A further object of the invention is to provide a photographic apparatus wherein repeated exposing of film frames can be prevented in a plurality of ways.

An additional object of the invention is to provide a still camera of the type wherein the film transporting mechanism comprises a transmission with novel and improved means for preventing the movement of camera release to its operative position prior to completion of film transport by the length of a frame.

The invention is embodied in a photographic apparatus which comprises a rotary takeup member serving to collect exposed film frames, film transporting means including a transmission (preferably a planetary transmission) having input means preferably including the planet carrier of the transmission and being movable from a starting position to a second or end position and back to the starting position, a first rotary output member which may constitute the ring gear of the transmission and is arranged to rotate the takeup member in a direction to collect exposed film during one (preferably the first) stage of movement of the input means from its starting position, and a second output member which may constitute the sun gear of the transmission or a gear which is rotatable by the sun gear and is arranged to rotate during another (preferably second) stage of movement of the input means from its starting position, a control member which normally engages the second output member, means for disengaging the control member from the second output member in response to completion of film transport by the length of a frame, i.e., in response to completion of the first stage of movement of the input means from its starting position, and camera release means which is movable from an inoperative position to an operative position along a predetermined path into which the control member extends while engaging the second output member so that the release means can reach the operative position and thereby initiate the making of an exposure only when the control member is disengaged from the second output member.

In accordance with another feature of the invention, a portion of the input means also extends into the path of movement of the release means to the operative position whenever the input means is out of its starting position.

The novel features which are considered as characteristic for the invention are set forth in particular in the appended claims. The improved photographic apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
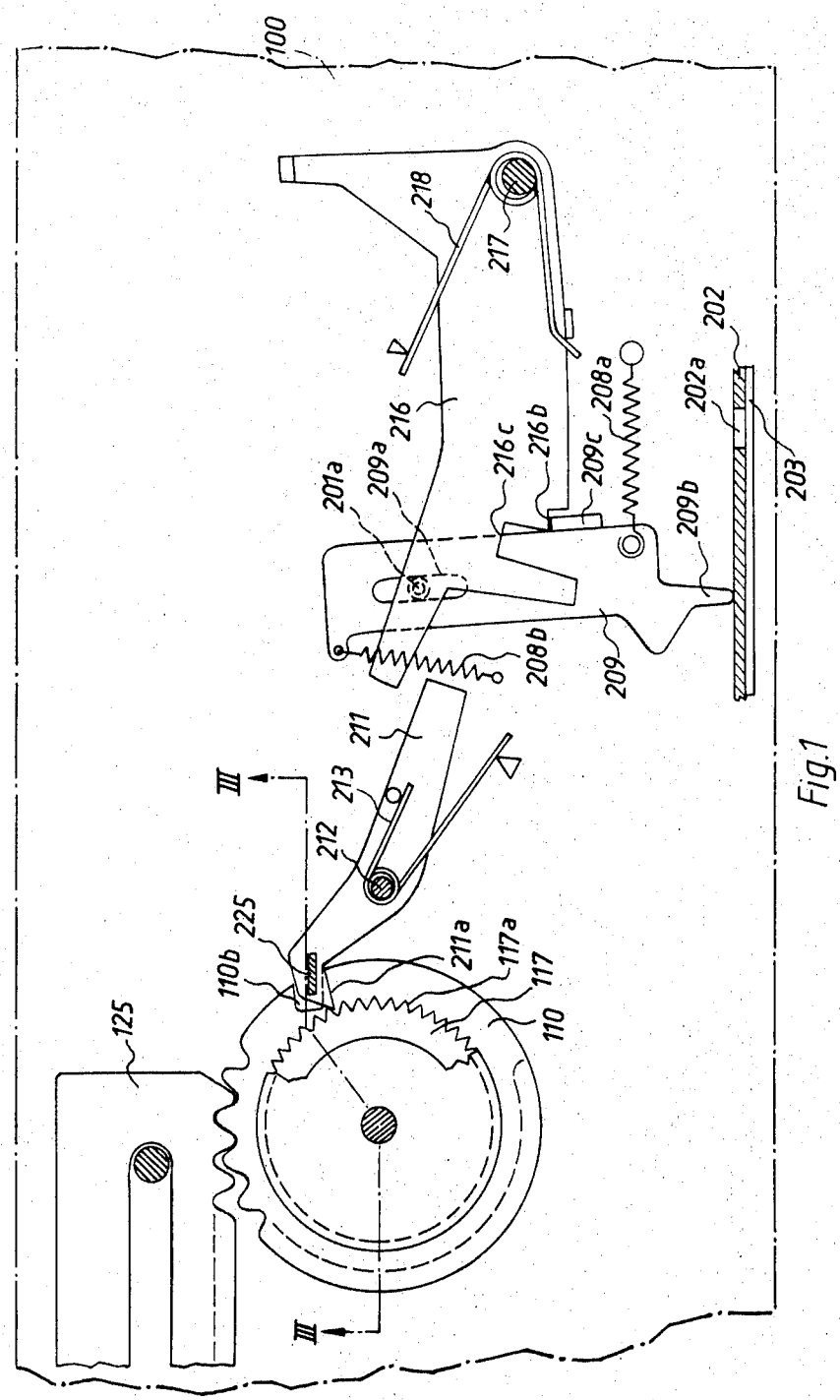
FIG. 1 is an enlarged fragmentary horizontal sectional view of a photographic apparatus which embodies one form of the invention, with the input means of the transmission shown in its starting position.
Figure 3:
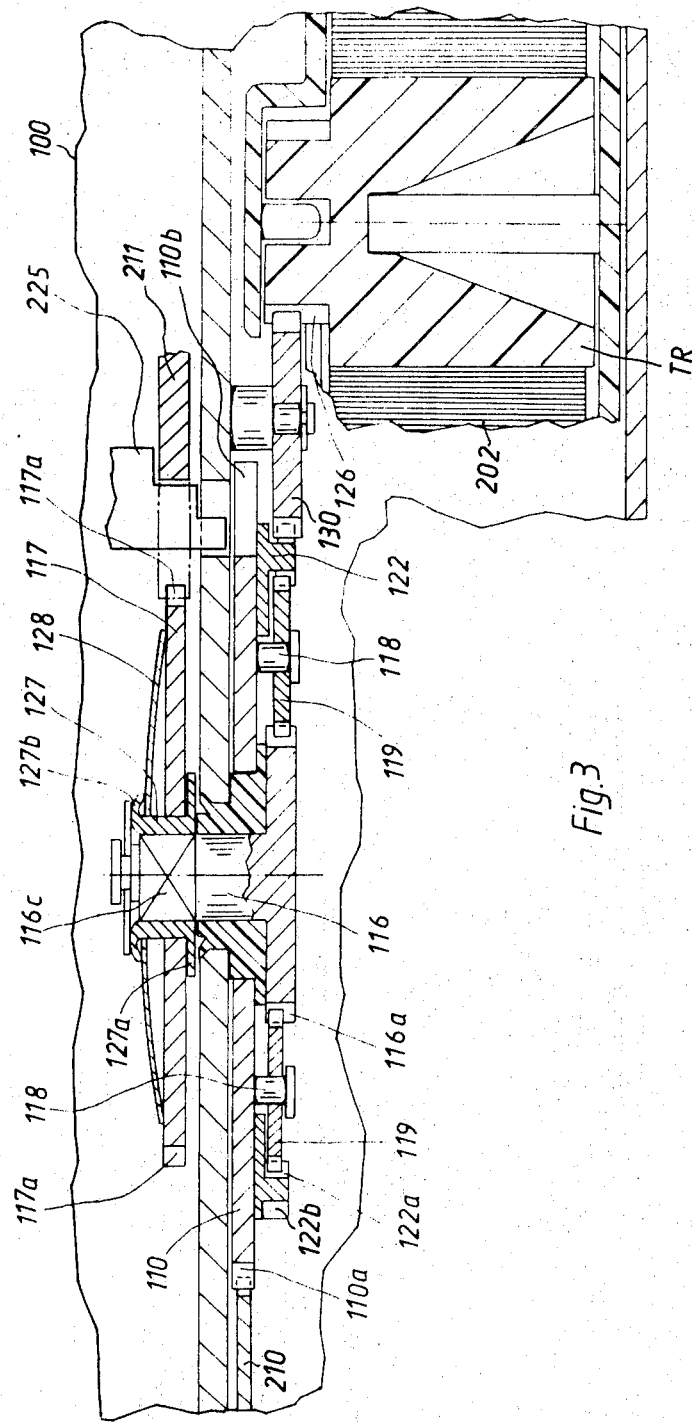
FIG. 3 is an enlarged sectional view as seen in the direction of arrows from the line III—III of FIG. 1.

Referring first to FIGS. 1 and 3, there is shown a portion of a still camera having a housing 100 which contains a supply reel (not shown) and a takeup reel TR for roll film 202. The film 202 has a row of perforations 202a, one for each film frame, and can be confined in a suitable cassette (not shown) which further contains a strip of backing paper 203 for the film 202.

The film transporting mechanism of the camera comprises a wheel 110 which is rotatably mounted in the interior of the housing 100 and has an annulus of teeth 110a one of which is normally engaged by the pallet of a retractable blocking pawl 210 serving to hold the wheel 110 against rotation in one direction. The means for rotating the wheel 110 from a starting position which is shown in FIG. 1 to an end position or second position (close to that shown in FIG. 2) and back to the starting position of FIG. 1 comprises a reciprocable actuating member 125 which resembles a toothed rack and a portion of which extends from the housing 100, preferably in a region close to one corner of the housing. A return spring 127 (see FIG. 2) is provided to bias the actuating member 125 to the starting position of FIG. 1. The blocking pawl 210 is automatically disengaged from the adjacent tooth 110a when the spring 127 is free to start retracting the actuating member 125 back to the position of FIG. 1. For example, the pawl 210 can be disengaged from the wheel 110 by a control lever 211 when the latter is disengaged from a gear 117.

The wheel 110 is further provided with a peripheral recess or notch 110b which moves along an arc of less than 360° while the wheel 110 is being rotated from the starting position of FIG. 1 to a second or end position or vice versa. The wheel 110 constitutes the planet carrier of a planetary transmission and carries three equidistant shafts 118 for discrete planet pinions 119. The teeth of the pinions 119 mesh with the teeth 116a of a sun gear 116 and with the internal teeth 122a of an internal gear or ring gear 122. The external teeth 122b of the ring gear 122 mesh with the teeth of an intermediate gear 130 which can rotate a gear 126 on the takeup reel TR in a direction to effect a movement of the film 202 from the supply reel toward the takeup reel.

The parts 110, 125 constitute a composite input means of the transmission, the ring gear 122 is the first output member, and the gear 117 is the second output member which is coaxial with the wheel 110.

The sun gear 116 normally rotates with the gear 117 which is formed with an annulus of teeth 117a engageable by the tooth or pallet 211a of the two-armed control lever 211 which is pivotable on a fixed shaft 212 and is biased against the gear 117 by a torsion spring 213. The control lever 211 normally maintains its tooth 211a in engagement with the adjacent teeth 117a of the gear 117 as long as the scanning arm 209b of a movable feeler 209 does not enter the oncoming perforation 202a of the film 202. Once the scanning arm 209b penetrates into the oncoming perforation 202a of the film 202, the control lever 211 is caused to pivot against the opposition of the torsion spring 213 and moves its tooth 211a away from the teeth 117a so that the gear 117 is free to rotate with the sun gear 116. The scanning arm 209b is automatically retracted from the adjacent perforation 202a when the user actuates the camera release 125. The arm 209b is retracted before the actuating member 125 is moved by hand to advance the film 202 by the length of a frame subsequent to completion of an exposure. The transport of film 202 by the length of a frame is terminated shortly after the scanning arm 209b penetrates into the oncoming perforation 202a; such termination of film transport takes place as soon as the control lever 211 is disengaged from the gear 117 because the gears 116, 117 then offer less resistance to rotation than the ring gear 122, intermediate gear 130, gear 126 and takeup reel TR. This is attributed to tension of the film 202 and also to friction.

The camera further comprises an overload clutch which is interposed between the sun gear 116 and gear 117 and allows the sun gear 116 to rotate relative to the gear 117 when the ring gear 122 cannot rotate while the control lever 211 engages the gear 117. This can happen if the last full film frame is followed by an incomplete film frame so that the wheel 110 could not be rotated all the way to its second position in the absence of some means which would permit the gear 116 and/or 122 of the planetary transmission to rotate while the operator forces the actuating member 125 all the way to its fully depressed position. The absence of an overload clutch between the gears 116, 117 (or between the gear 117 and control lever 211) could result in a tearing of the film 202 and/or in damage to component parts of the camera.

The overload clutch is shown in FIG. 3 and comprises a sleeve 127 which is non-rotatably mounted on a polygonal stub 116c of the shaft of the sun gear 116. The gear 117 is rotatable on the sleeve 127 and abuts against one flange 127a of this sleeve. A second flange 127b of the sleeve 127 serves as a retainer for the median portion of a dished spring 128 whose marginal portion bears against the exposed end face of the gear 117 and biases the other end face of the gear 117 into frictional engagement with the flange 127a. The bias of the spring 128 is selected in such a way that the sun gear 116 is free to rotate relative to the gear 117 if the user of the camera continues to rotate the wheel 110 clockwise, as viewed in FIG. 1 or 2, while the gear 122 is held against rotation and the control lever 211 engages the gear 117, before the film 202 tears and before the parts of the camera are damaged. As mentioned above, this can take place if the last frame of the film 202 is shorter than a normal frame so that the supply reel cannot continue to pay out film while the wheel 110 is still in the process of moving from the starting position of FIG. 1 to the aforementioned second position. When the sun gear 116 rotates but the gear 117 is held by the control lever 211, the sleeve 127 simply rotates in the central opening of the gear 117 and with respect to the spring 128 (which latter, however, can rotate with the sleeve 127).

The feeler 209 is directly biased by two helical springs 208a, 208b and can be indirectly biased by a torsion spring 218. The means for guiding the feeler 209 comprises a fixed guide pin 201a which is secured to the housing 100 and extends into an elongated slot 209a of the feeler. The spring 208b biases the scanning arm 209b against the front side of the film 202 in line with the row of perforations 202a. The spring 208a biases the scanning arm 209b counter to the direction of film transport, i.e., in a direction to the right, as viewed in FIGS. 1 or 2. The feeler 209 further comprises a projection 209c which can constitute an integral lug bent through 90° from the general plane of the feeler.

Figure 2:
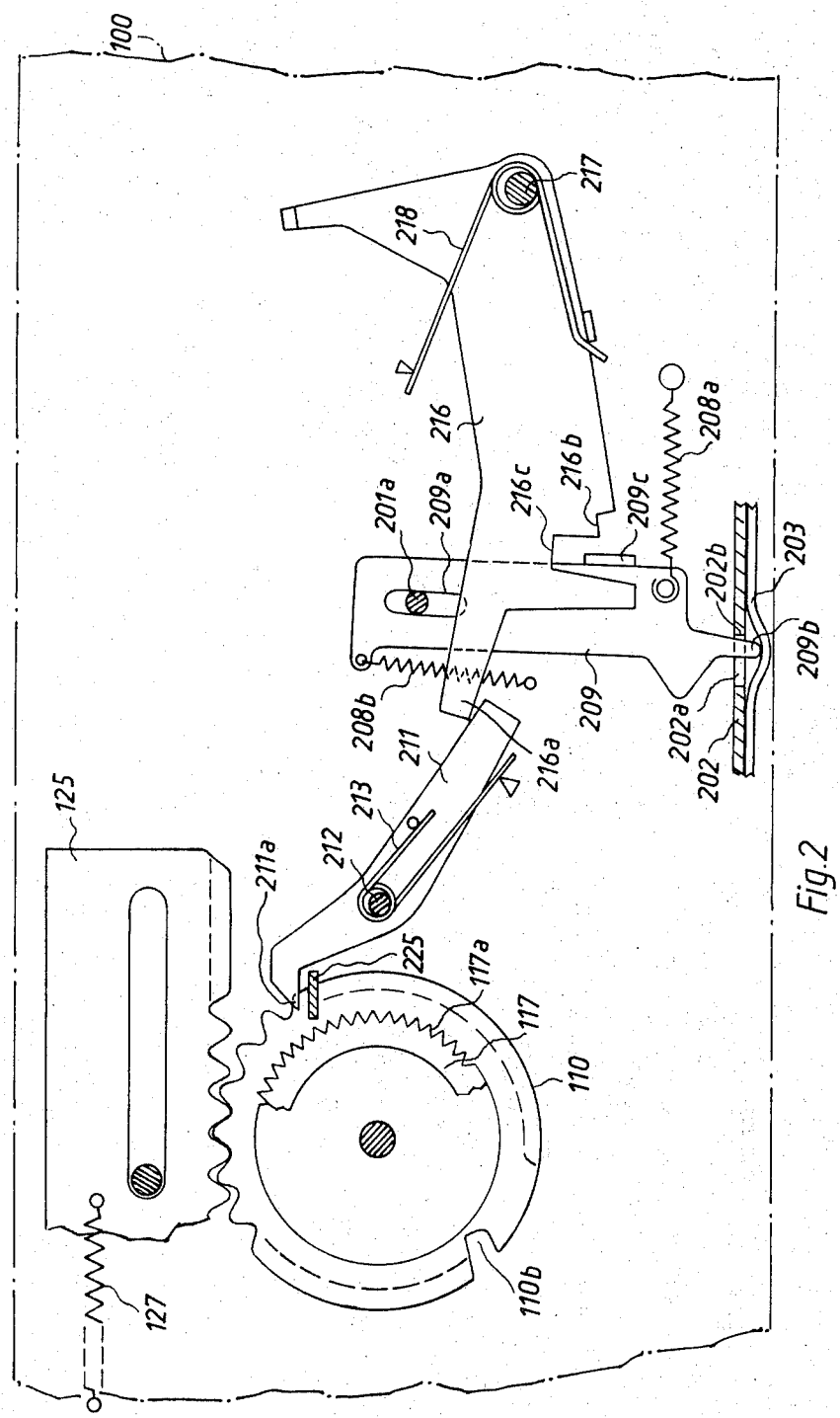
FIG. 2 is a similar sectional view but showing the input means close to a second or end position.

The aforementioned torsion spring 217 can act on the feeler 209 through the medium of a lever 216 which is mounted on a fixed pivot 217 and is biased by the torsion spring 218 in a counterclockwise direction, as viewed in FIGS. 1 or 2. That edge face of the lever 216 which faces the front side of the film 202 is formed with a relatively shallow recess or notch 216b and a relatively deep recess or notch 216c. When the scanning arm 209b bears against the front side of the film 202, the projection 209c extends into the shallower recess 216b (see FIG. 1) whereby the torsion spring 218 causes the lever 216 to urge the feeler 209 toward the film. The spring 218 then cooperates with the helical spring 208b.

When the operator of the camera depresses the actuating member 125 to rotate the wheel 110 in a direction to transport the film 202 forwardly (in a direction to the left, as viewed in FIG. 1), the scanning arm 209b penetrates into the oncoming perforation 202a under the action of the springs 208b, 218. The spring 208a then urges the scanning arm 209b against the surface 202b at the trailing end of the respective perforation 202a (see FIG. 2) but is sufficiently weak to allow the film 202 to pivot the feeler 209 clockwise via scanning arm 209b so that the projection 209c automatically leaves the recess 216b and is automatically received in the deeper recess 216c because the torsion spring 218 is free to pivot the lever 216 anticlockwise as soon as the projection 209c slides off the shoulder in the deepmost portion of the shallower recess 216b. This causes the spring 218 to again cooperate with the spring 208b and to urge the tip of the scanning arm 209 b against the adjacent portion of the backing paper 203 which is thereby flexed to a certain degree but offers sufficient resistance to limit the extent of penetration of the arm 209b into the perforation 202a (see FIG. 2).

When the projection 209c slides off the shoulder in the recess 216b of the lever 216, the arm 216a of the lever 216 strikes against the right-hand arm of the control lever 211 and pivots the latter clockwise so that the tooth 211a becomes disengaged from the adjacent teeth 117a of the gear 117. This terminates the transport of film by the length of a frame because the gear 122, together with the gears 130, 126 and film which is convoluted on the takeup reel TR, offers greater resistance to rotation than the gears 116, 117. Consequently, during the next stage of movement of the wheel 110 to its second position, the gear 122 is at a standstill but the gears 116, 117 normally rotate and the gears 116, 117 can cock the shutter and/or perform another useful function which is completed before the camera is ready to make an exposure. As mentioned above, the control lever 211 can disengage the pawl 210 from the wheel 110 as soon as the tooth 211a moves away from the teeth 117a of the gear 117; the wheel 110 is then free to rotate under the action of the spring 127 to reassume the starting position of FIG. 1.

The scanning arm 209b of the feeler 209 is automatically retracted from the adjacent perforation 202a in response to actuation of the camera release 225 so that the spring 208a can slightly contract and moves the scanning arm 209b to the right and beyond the adjacent perforation. The spring 208b urges the feeler 209 against the front side of the film 202 and the camera is ready to transport the film 202 by the length of a frame in response to renewed depression of the actuating member 125. The manner in which the scanning arm 209b is retracted from the adjacent perforation 202a in response to depression of the camera release forms no part of the present invention. The actuation of camera release 225 further results in pivoting of the lever 216 in clockwise direction so that the projection 209c of the feeler 209 can reenter the shallower recess 216b. Clockwise pivoting of the lever 216 results in disengagement of the arm 216a from the control lever 211 so that the torsion spring 213 is free to return the tooth 211a into engagement with the adjacent teeth 117a of the gear 117. Since the gears 116, 117 are held against rotation and the scanning arm 209b is extracted from the adjacent perforation, the actuating member 125 can be depressed again against the opposition of the spring 127 to advance the film 202 by the length of a frame and to thereupon cock the shutter before the wheel 110 reaches its second position.

In accordance with a feature of the invention, the parts 110, 211 constitute a simple but effective means for preventing repeated exposure of film frames. The camera release 225 is movable substantially or exactly at right angles to the plane of the control lever 211 or wheel 110 and is mounted in such a way that its tip (which is located in the housing) cannot reach the shutter when the control lever 211 engages the gear 117 and/or when the wheel 110 does not dwell in the starting position of FIG. 1. As shown in FIG. 1, the aforementioned notch 110b of the wheel 110 is in register with the camera release 225 only when the parts 110, 125 assume their starting positions. The control lever 211 is located between the notch 110b and the tip of the camera release 125 and prevents the release 225 from entering the notch 110b when the tooth 211a holds the gear 117 (and therefore normally also the gear 116) against rotation.

The control lever 211 prevents a depression of the camera release 225 to an operative position, i.e., to the extent which is necessary to actuate the shutter, as long as the tooth 211a engages the gear 117, i.e., as long as the wheel 110 performs the first stage of its angular movement from the starting position of FIG. 1 in order to transport the film 202 by the length of a frame. When the transport of film 202 by the length of a frame is completed, the lever 216 disengages the control lever 211 from the gear 117 so that the gears 116, 117 are free to rotate; however, the release 225 still cannot leave its inoperative position because its tip is out of register with the notch 110b of the wheel 110 as long as this wheel does not return to its starting position. Thus, an exposure can be made only after the transport of film 202 by the length of a frame is completed, after the wheel 110 has caused the gear 116 and/or 117 to cock the shutter, and after the spring 127 was thereupon allowed to return the wheel 110 to the starting position of FIG. 1.

The control lever 211 returns to the position of FIG. 1 as soon as the camera release 225 is free to return to its inoperative position. Consequently, the tooth 211a registers with the notch 110b and prevents a renewed depression of the release 225 until after the transport of the film 202 by the length of a frame is completed.

When the wheel 110 rotates under the action of spring 127, the tooth 211a of the lever 211 rides over the teeth 117a of the gear 117.

An advantage of the just described means for preventing repeated exposure of film frames is that such means does not have to include any parts in addition to those parts which also perform one or more further functions. Thus, the wheel 110 constitutes an element of the input means of the planetary transmission, and the control lever 211 determines that stage of movement of the wheel 110 from its starting position at which the transport of the film 202 is completed and the cocking of the shutter can begin. The details of the shutter which is actuated to admit scene light to the foremost unexposed film frame in response to penetration of the tip of the camera release 225 through and beyond the notch 110b forms no part of this invention.

It is clear that the improved camera is susceptible of many further modifications. For example, the notch 110b can be omitted if the camera release 225 is in register with a portion of the control lever 211 which is remote from the teeth 117a of the gear 117; the camera then prevents a depression of the release 225 only while the wheel 110 is rotated for the purpose of advancing the film by the length of a frame. Furthermore, the improved means for preventing double exposure of film frames can be employed with equal advantage in other types of cameras for use with photographic film having a row of perforations, one for each film frame. All that counts is to mount the camera release in such a way that it cannot be depressed or otherwise displaced from its inoperative position until and unless the scanning arm of the feeler has penetrated into the oncoming perforation and the control member has been displaced in response to such penetration to terminate further transport of the film.

Without further analysis, the foregoing will so fully reveal the gist of the present invention that others can by applying current knowledge readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims.

We claim:

1. In a photographic apparatus, a combination comprising a rotary takeup member arranged to collect exposed film frames; film transporting means including a transmission having input means movable from a starting position, a first rotary output member arranged to rotate said takeup member in a direction to collect the film during one stage of movement of said input means from said starting position, and a second output member arranged to rotate during another stage of movement of said input means; a control member normally engaging said second output member; means for normally disengaging said control member from said second output member in response to completion of film transport by the length of a frame to thereby complete said one stage of movement of said input means from said starting position; and camera release means movable along a predetermined path from an inoperative position to an operative position, said control member extending across said path while in engagement with said second output member so that said release means can move to said operative position only upon completion of said one stage of movement of said input means from said starting position.

2. A combination as defined in claim 1, wherein said input means is movable back and forth between said starting position and a second position and said control member is movable into and from engagement with said second output member in a predetermined plane which is normal to the direction of movement of said release means between said operative and inoperative positions.

3. A combination as defined in claim 1 for use with roll film having a row of perforations, one for each film frame, said means for disengaging said control member including a feeler having a scanning portion arranged to engage the film and to penetrate into an oncoming perforation during said one stage of movement of said input means, and means for disengaging said control member from said second output member in response to penetration of said scanning portion into the oncoming perforation.

4. A combination as defined in claim 1, wherein said second output member is a gear and said control member includes a lever which is pivotable into and from engagement with said gear.

5. A combination as defined in claim 1, wherein said transmission is a planetary transmission and said input means comprises a portion which constitutes a rotary planet carrier of said transmission, said planet carrier extending across said path except in said starting position of said input means.

6. A combination as defined in claim 5, wherein said second output member is a gear which is coaxial with said planet carrier.

7. A combination as defined in claim 6, wherein said input means is movable back and forth between said starting position and a second position and said planet carrier has a recess which registers with said release means and permits a movement of said release means to said operative position in said starting position of said input means.

8. A combination as defined in claim 1, wherein said second output member is a gear and said control member is pivotable into and from engagement with said gear and extends into said path while holding said gear against rotation in response to movement of said input means.

9. A combination as defined in claim 1, further comprising overload clutch means interposed between said input means and one of said output members.

10. A combination as defined in claim 1, further comprising means for biasing said control member into engagement with said second output member and means for biasing said input means to said starting position.

* * * * *